United States Patent
Iwata et al.

(10) Patent No.: US 7,139,030 B2
(45) Date of Patent: Nov. 21, 2006

(54) VIDEO SIGNAL PROCESSING APPARATUS

(75) Inventors: Takeharu Iwata, Yamanashi-ken (JP);
Kazunori Ochiai, Yamanashi-ken (JP);
Hirofumi Honda, Yamanashi-ken (JP);
Tetsuro Nagakubo, Yamanashi-ken (JP)

(73) Assignee: Pioneer Corporation, Tokyo (JP)

( * ) Notice: Subject to any disclaimer, the term of this patent is extended or adjusted under 35 U.S.C. 154(b) by 449 days.

(21) Appl. No.: 10/789,993

(22) Filed: Mar. 2, 2004

(65) Prior Publication Data

US 2004/0179137 A1 Sep. 16, 2004

(30) Foreign Application Priority Data

Mar. 11, 2003 (JP) ............................. 2003-065043

(51) Int. Cl.
*H04N 7/01* (2006.01)

(52) U.S. Cl. ....................................... 348/441; 348/459

(58) Field of Classification Search ................ 348/441, 348/448, 455, 458, 459, 529, 558, 911; *H04N 7/01, H04N 11/20*
See application file for complete search history.

(56) References Cited

U.S. PATENT DOCUMENTS

| 6,111,610 A | | 8/2000 | Faroudja |
| 6,154,257 A | * | 11/2000 | Honda et al. ............... 348/459 |
| 6,222,589 B1 | | 4/2001 | Faroudja et al. |
| 2002/0036603 A1 | | 3/2002 | Nagakubo et al. |

FOREIGN PATENT DOCUMENTS

WO        99/34597        7/1999

* cited by examiner

*Primary Examiner*—Sherrie Hsia
(74) *Attorney, Agent, or Firm*—Drinker Biddle & Reath LLP

(57) ABSTRACT

A video signal processing apparatus in which an input video signal is written in a frame memory on a line sequential scanning frame unit base in synchronism with a first vertical synchronizing signal and which the line sequential scanning video signal written in the frame memory is read out in synchronism with a second vertical synchronizing signal. The second vertical synchronizing signal having a frequency different from a frequency of a first vertical synchronizing signal is generated in synchronism with the first vertical synchronizing signal of a starting frame of five frames forming a pattern after the conversion in the 2-3 pulldown conversion system when it is judged that the input video signal is based on a telecine-converted video signal.

4 Claims, 4 Drawing Sheets

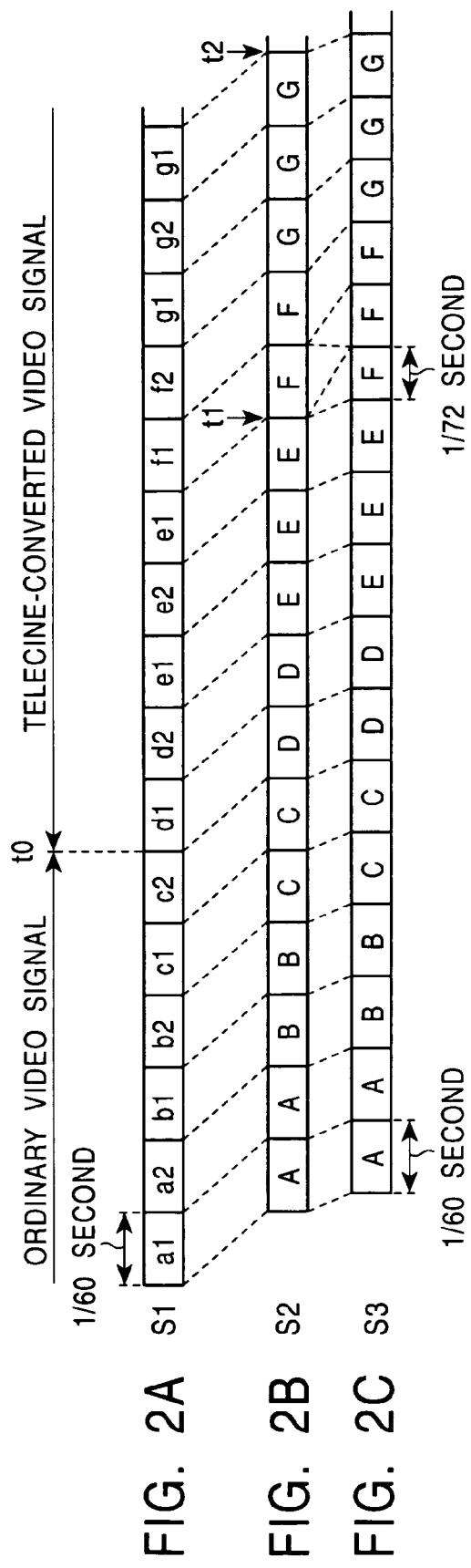

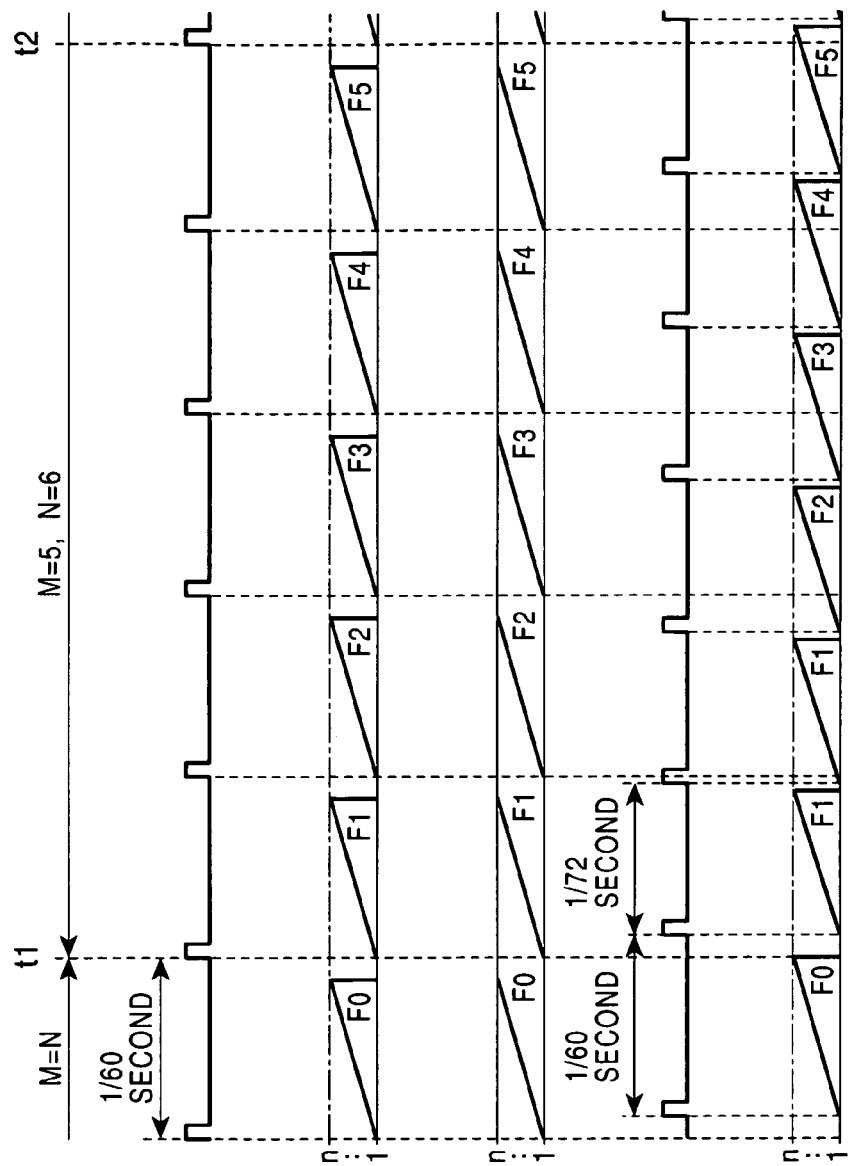

VIDEO SIGNAL PROCESSING APPARATUS

BACKGROUND OF THE INVENTION

1. Field of the Invention

The present invention relates to a video signal processing apparatus that processes an input video signal to display at high quality on a display device, the input video signal being a telecine-converted video signal generated by the 2-3 pulldown conversion system, from a movie film.

2. Description of the Related Background Art

Video signals of a standard television format, such as the NTSC format, often include video signals based on films. A movie film has 24 film frames per second. A video signal of the standard television format has 30 frames per second, and is an interlaced scan video signal having two fields for each frame. Since the number of frames per second differs between a video signal and a movie film, each frame of the movie film is usually telecine-converted by the 2-3 pulldown conversion system to obtain a video signal of the standard television format.

In the 2-3 pulldown conversion system, the first and the second field of the first frame of a video signal are produced from the first film frame, the first and the second field of a second frame and a first field of a third frame of the video signal are produced from the second film frame, and the second field of the third frame and the first field of a fourth frame of the video signal are produced from the third film frame. The following frames are converted similarly, so that two fields, three fields, two fields, three fields, etc. of the video signal are respectively produced from each consecutive film frame.

Thus, two film frames correspond to five frames of a standard television format video signal, and each film frame is alternately converted into a video signal of two fields and a video signal of three fields.

However, when a video based on the interlaced scan video signal which is telecine-converted is displayed on a display device, such as a PDP, then, for example, the third frame of the consecutive frames of the video signal is combined from images of the second and the third frames of the movie film. Therefore, there was a problem that the image quality is poorer than that of an original movie film.

In order to overcome the above problem, Japanese Patent Laid-Open No. 2001-346131 discloses that a telecine-converted interlaced scanning video signal is converted by an interfiled interpolation process into a line sequential scanning video signal, which is thinned out and written in a memory on a field unit base, and that the line sequential scanning video signal written in a memory is repeatedly read out n times from the memory at a rate of n times (n denotes an integral number not lower than 2 as such 2) as high as 24 Hz.

As described above, two film frames of a film source correspond to five frames of a line sequential scanning video signal when the interlaced scanning video signal having 60 fields per second, which is telecine-converted by the 2-3 pulldown conversion system from the film source having 24 film frames per second, is further converted into the line sequential scanning video signal. In the line sequential scanning video signal, two-frame video signals per film frame and three-frame video signals per film frame are thus alternately repeated.

When the frame rate is changed from five frames (a 2-3 pattern) to six frames (a 3-3 pattern) of such video signal in conversion of two film frames of a film source, conversion into a 2-4 pattern occurs regardless of a changing point of a film frame of the film source, which causes a problem that the display quality deteriorates.

SUMMARY OF THE INVENTION

An object of the invention is to provide a video signal processing apparatus in which display quality of a telecine-converted image is further improved.

An video signal processing apparatus according to the invention comprises: a detector which detects whether or not an input video signal is based on a telecine-converted video signal obtained by telecine conversion in a 2-3 pulldown conversion system from a film source having 24 film frames per second; a frame memory; a writing device which writes the input video signal in the frame memory on a line sequential scanning frame unit base in synchronism with a first vertical synchronizing signal for writing; a reading device which reads out the written line sequential scanning video signal in the frame memory in synchronism with a second vertical synchronizing signal for reading; and a synchronism controller which generates the second vertical synchronizing signal having a frequency different from a frequency of the first vertical synchronizing signal in synchronism with the first vertical synchronizing signal of a starting frame of five frames forming a pattern after the conversion in the 2-3 pulldown conversion system when the detector judges that the input video signal is based on a telecine-converted video signal.

BRIEF DESCRIPTION OF THE DRAWINGS

FIGS. 2A to 2C illustrate a relation between fields and frames of respective video signals in the video signal processing apparatus shown in FIG. 1.

FIGS. 3A to 3E show timing of writing and reading operations of the video signal processing apparatus shown in FIG. 1.

DETAILED DESCRIPTION OF THE INVENTION

An embodiment of the invention will be now described in detail with reference to the drawings.

Figure 1:
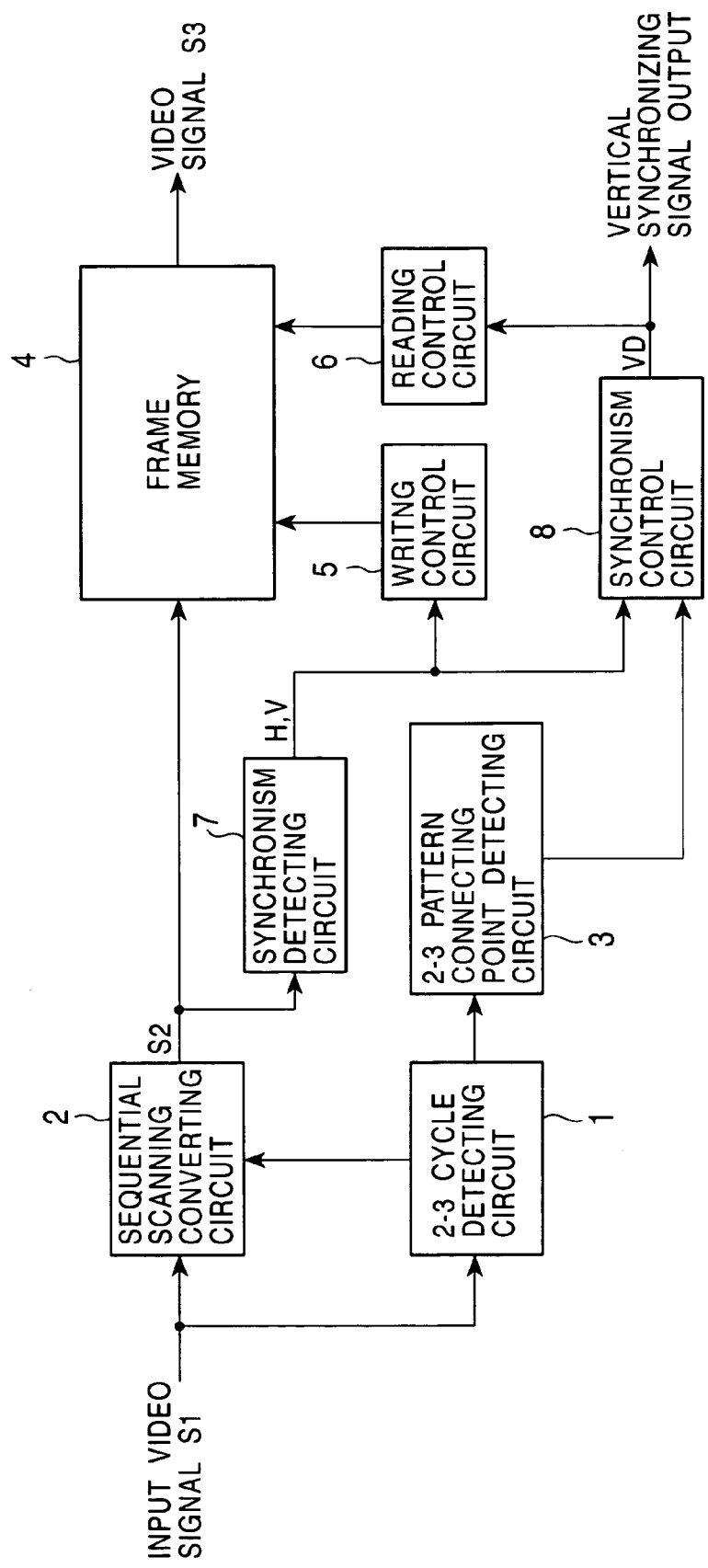
FIG. 1 is a block diagram showing the structure of a video signal processing apparatus according to the present invention.

FIG. 1 shows a video signal processing apparatus to which the present invention is applied. The video signal processing apparatus comprises a 2-3 cycle detecting circuit 1, a sequential scanning converting circuit 2, a 2-3 pattern connecting point detecting circuit 3, a frame memory 4, a writing control circuit 5, a reading control circuit 6, a synchronism detecting circuit 7 and a synchronism control circuit 8.

The 2-3 cycle detecting circuit 1 judges that an input video signal of interlaced scanning is either a signal portion of two fields per film frame or a signal portion of three fields per film frame. The 2-3 cycle detecting circuit 1 thus detects that the input video signal is a telecine-converted video signal obtained by telecine conversion in the 2-3 pulldown conversion system. The sequential scanning converting circuit 2 converts an input video signal S1 into a line sequential scanning video signal S2 in accordance with the detected signal from the 2-3 cycle detecting circuit 1. Two fields of the video signal S1, which form the signal portion of two fields, are first stored respectively, and then, alternately output. The beginning two fields of the video signal S1, which form the signal portion of three fields, are first stored respectively, and then, alternately output. That is, when the 2-3 cycle detecting circuit 1 detects a still picture field in which fields coincide between successive frames, the still picture field is neglected.

The 2-3 pattern connecting point detecting circuit 3 detects a point in the line sequential scanning video signal S2 output from the sequential scanning converting circuit 2 on the basis of the detection result in the 2-3 cycle detecting circuit 1, the point at which a film frame changes. Namely, the 2-3 pattern connecting point detecting circuit 3 detects a point where a 2-3 pattern changes to the subsequent 2-3 pattern in the line sequential scanning video signal S2 to generate a changing point signal.

The line sequential scanning video signal S2 output from the sequential scanning converting circuit 2 is written in the frame memory 4 on a frame unit base. The written video signal is read out from the frame memory 4 on the frame unit base. The writing control circuit 5 controls the writing in the frame memory 4 while the reading control circuit 6 controls the reading. The video signal read out from the frame memory 4 is supplied as S3 to a display device such as a plasma display.

The synchronism detecting circuit 7 detects horizontal and vertical synchronizing signals in the line sequential scanning video signal S2 to generate horizontal and vertical synchronism detection signals H and V. These synchronism detection signals H and V are supplied to the writing control circuit 5 to be used as a reference signal for writing timing of the video signal S2. The detection synchronism signal generated by the synchronism detecting circuit 7 is also supplied to the synchronism control circuit 8.

The synchronism control circuit 8 generates a vertical synchronizing signal VD for timing of reading by the reading control circuit 6 in accordance with the synchronism detection signals H and V and the changing point signal output from the 2-3 pattern connecting point detecting circuit 3. The synchronism control circuit 8, concretely, converts the vertical synchronizing signal of the line sequential scanning video signal (frequency $f_1$; 60 Hz, for example) into the vertical synchronizing signal VD having a desired vertical synchronizing frequency $f_2$, that is, 72 Hz, for example, on the basis of the first conversion factor M and the second conversion factor N (M and N are natural numbers). The vertical synchronizing frequency $f_2$ can be expressed by the following formula. The second conversion factor N is larger than the first conversion factor M and twice or less as large as the value of the first conversion factor M.

$$f_2 = f_1 \cdot (N/M) \quad M < N \leq 2 \times M$$

The vertical synchronizing signal VD is output to the reading control circuit 6 with timing based on the vertical synchronism detection signal V to be a reference signal for timing of reading of the video signal from the frame memory 4. The vertical synchronizing signal VD has the same frequency as the vertical synchronism detection signal V in the case of M=N. The duration per a frame of respective writing and reading video signals is thus the same. The duration per a frame of each reading video signal is shorter than that of each writing video signal since the frequency of the vertical synchronizing signal VD is higher than that of the vertical synchronism detection signal V in the case of M<N.

It is now assumed that, in the video signal processing apparatus having the above described structure, the 2-3 cycle detecting circuit 1 judges that the interlace input video signal S1 is not a telecine-converted video signal. The ordinary video signal S1 in the NTSC format, which is not based on a film, is then supplied in the order of a field a1, a field a2, a field b1, a field b2, a field c1 and a field c2, for example, as shown in FIG. 2A. The duration of a field is ⅟60 second. The first field a1 and the second field a2 form a frame together. The fields b1 and b2 and the fields c1 and c2 also respectively form a frame similarly. When the video signal is not a telecine-converted video signal, as descried above, the sequential scanning converting circuit 2 converts the input video signal into the line sequential scanning video signal S2 in accordance with a non-detection signal from the 2-3 cycle detecting circuit 1. The line sequential scanning video signal S2 has frames A, A, B, B, C and C as shown in FIG. 2B corresponding to the fields a1, a2, b1, b2, c1 and c2 shown in FIG. 2A. The frame A is based on the fields a1 and a2. The frame B is based on the fields b1 and b2 and the frame C is based on the fields c1 and c2 likewise.

The memory writing control circuit 5 writes the frames A, A, B, B, C and C of the above video signal S2 in that order in the frame memory 4. The timing of writing synchronizes with the frequency of the vertical synchronism detection signal V, 60 Hz. The synchronism control circuit 8 generates the vertical synchronizing signal VD in accordance with the vertical synchronism detection signal V. The relationship M=N is set since the frames A, A, B, B, C and C are not a video signal based on a film, and thus, the vertical synchronizing signal VD is a pulse synchronizing with the vertical synchronism detection signal V. The pulse of the vertical synchronizing signal VD is however generated somewhat later than generation of a pulse of the vertical synchronism detection signal V. Accordingly, the memory reading control circuit 6 reads out the frame stored in the frame memory 4 in accordance with the vertical synchronizing signal VD, so that the video signal S3 having frames A, A, B, B, C and C shown in FIG. 2C, which are the same as the frames A, A, B, B, C and C of the video signal S2, can be obtained.

Next, it is assumed that, as shown in FIGS. 2A to 2C, the 2-3 cycle detecting circuit 1 judges at a time point to that the interlaced input video signal S1 is a telecine-converted video signal.

The input video signal S1 in the NTSC format, which is based on a movie film, is supplied in the order of fields d1, d2, e1, e2, e1, f1, f2, g1, g2 and g1 as shown in FIG. 2A. The duration of a field is ⅟60 second. The fields d1 and d2 and the fields f1 and f2 correspond to a signal portion of two fields in the 2-3 pulldown conversion system while the fields e1, e2 and e1 and the fields g1, g2 and g1 correspond to a signal portion of three fields.

Thus, the sequential scanning converting circuit 2 converts an input video signal into the line sequential scanning video signal S2 in accordance with the 2-3 cycle detection signal from the 2-3 cycle detecting circuit 1 when the video signal S1 is a telecine-converted video signal. The line sequential scanning video signal S2 has frames D, D, E, E, E, F, F, G, G and G as shown in FIG. 2B corresponding to the fields d1, d2, e1, e2, e1, f1, f2, g1, g2 and g1 shown in FIG. 2A.

The memory writing control circuit 5 writes in the frame memory 4 the first 2-3 pattern frames D, D, E, E and E of the above video signal S2 in that order. The timing of writing synchronizes with the frequency of the vertical synchronism detection signal V, 60 Hz. The synchronism control circuit 8 generates the vertical synchronizing signal VD in accordance with the vertical synchronism detection signal V. The relationship M=N is formed since the frames D, D, E, E and E are frames in the 2-3 pattern, which do not receive from the 2-3 pattern connecting point detecting circuit 3 a pattern connecting point detection signal showing a connecting point of the 2-3 pattern. The vertical synchronizing signal VD is thus a pulse signal of 60 Hz synchronizing with the vertical synchronism detection signal V. The pulse of the vertical synchronizing signal VD is however generated somewhat later than generation of a pulse of the vertical synchronism detection signal V. Accordingly, the memory reading control circuit 6 reads out the frame stored in the frame memory 4 in accordance with the vertical synchronizing signal VD, so that the video signal S3 having frames D, D, E, E and E shown in FIG. 2C, which are the same as the 2-3 pattern frames D, D, E, E and E of the video signal S2, can be obtained.

The memory writing control circuit 5 writes in the frame memory 4 the subsequent 2-3 pattern frames F, F, G, G and G of the video signal S2 in that order in synchronism with the frequency of the vertical synchronism detection signal V, 60 Hz. The synchronism control circuit 8 receives from the 2-3 pattern connecting point detecting circuit 3 at a point of time t1 a pattern connecting detection signal showing a connecting point of the 2-3 pattern with relation to the frames F, F, G, G and G, and thus, M=5 and N=6. That is, the frame rate converting operation starts. The vertical synchronizing signal VD thus becomes a pulse signal having a frequency of 72 Hz, which is 6/5 of a frequency of 60 Hz of the vertical synchronism detection signal V. The memory reading control circuit 6 reads out the frame stored in the frame memory 4 in accordance with the vertical synchronizing signal VD of 72 Hz. The frame F of the video signal S2 just after t1 is read out twice. This operation will be described later. The following frames F, G, G and G are respectively read out only once. Accordingly, the video signal S3, which is read out, becomes a 3-3 pattern signal having the frames F, F, F, G, G and G as shown in FIG. 2C.

FIGS. 3A to 3E concretely show the timing of operations for writing and reading out the video signal in and from the frame memory 4 in the case that M=N changes to M=5 and N=6 at the time point t1. In FIGS. 3A to 3E, frames F0, F1, . . . and F5 of the video signal S2 are supplied to the frame memory 4. These frames correspond to the frames of the video signal S2 shown in FIG. 2B such that F0=E, F1=F2=F and F3=F4=F5=G. In this case, M=N until the frame F0 and M<N after the subsequent frame F1.

The vertical synchronism detection signal V detected from the video signal S2 by the synchronism detecting circuit 7 is generated as a pulse signal having a predetermined cycle as shown in FIG. 3A. The frames F0, F1, . . . and F5 of the video signal S2 are output in that order, as shown in FIG. 3B, from a point of time when a pulse of the vertical synchronism detection signal V rises. The respective frames comprise data 1 to n whose output is shown by oblique lines in FIG. 3B.

The writing control circuit 2 writes the video signal S2 in the frame memory 4 on a frame unit base in synchronism with the vertical synchronism detection signal V. Each frame is written in corresponding addresses 1 to n in the frame memory 4 in the order of data 1 to n from a point of time when the vertical synchronism detection signal V rises as shown in FIG. 3C. The respective addresses in the frame memory 4 hold the written data until the next data is newly written. Therefore, a region sorted by oblique lines in FIG. 3C shows duration held. For each address, the written data is held for the duration of the above predetermined cycle.

The synchronism control circuit 8 generates the vertical synchronizing signal VD having the frequency of 60 Hz as shown in FIG. 3D in the case of the 2-3 pattern frame, which do not receive from the 2-3 pattern connecting point detecting circuit 3 a pattern connecting point detection signal showing a connecting point of the 2-3 pattern, that is, in the case that the 2-3 pattern frame is detected just after the above time point t0. On the other hand, the synchronism control circuit 8 generates the vertical synchronizing signal VD having the frequency of 72 Hz as shown in FIG. 3D in the case of the 2-3 pattern frame, which receives from the 2-3 pattern connecting point detecting circuit 3 a pattern connecting point detection signal showing a connecting point of the 2-3 pattern, that is, in the case that the 2-3 pattern frame is detected just after the above time point t1.

The reading control circuit 6 reads out data from addresses 1 to n in the frame memory 4 in that order as shown in FIG. 3E in accordance with rising of the vertical synchronizing signal VD. The reading speed is the same as the writing speed in the case of the vertical synchronizing signal VD having the frequency of 60 Hz while it is 6/5 as fast as the writing speed in the case of the vertical synchronizing signal VD having the frequency of 72 Hz. Oblique lines in FIG. 3E show a reading status of the data 1 to n.

As shown in FIG. 3E, the frame F0 of the video signal S3 read out from the frame memory 4, the frame F0 which is based on the vertical synchronizing signal VD having the frequency of 60 Hz, is read out for the same duration as the frame F0 of the video signal S2. As for the frame F1, the data from the addresses 1 to n in the frame memory 4 are read out on the basis of the vertical synchronizing signal VD having the frequency of 72 Hz. No data of the frame F2 of the video signal S2 is written in the frame memory 4 at the time when the frame F1 of the video signal S3 is output, while the frame F1 is left in the frame memory 4 as it is. Accordingly, F1 is the frame read out from the frame memory 4 by the reading control circuit 6 in accordance with the subsequent vertical synchronizing signal VD having the frequency of 72 Hz. After the above, the frames F2, F3, F4 and F5 are read out in that order since the data of the frames F2, F3, F4 and F5 are held in the address 1 in the frame memory 4 at every rising time of the vertical synchronizing signal VD having the frequency of 72 Hz. The video signal S3 then has the frames F1, F1, F2, F3, F4 and F5, which correspond to the frames F1, . . . and F5 of the video signal S2. Namely, the 3-3 pattern such as the frames F, F, F, G, G and G corresponds to the two film frames as shown in FIG. 2C described above.

Figures 4A, 4B, 4C:
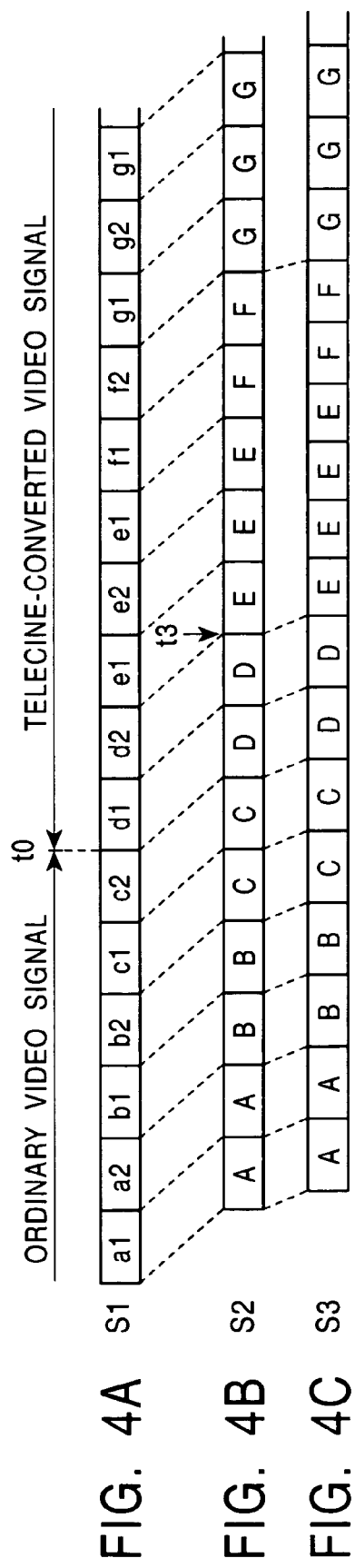
FIGS. 4A to 4C illustrate a relation between fields and frames of respective video signals in the case that frame rate conversion does not start from a starting frame of the 2-3 pattern.

FIGS. 4A to 4C show the case that the frame rate conversion does not start from a starting frame of the 2-3 pattern. FIGS. 4A and 4B show frames of the video signals S1 and S2 similarly to FIGS. 2A and 2B. The frame rate conversion starts from a frame E at a point of time t3 on the way of a 2-3 pattern of the video signal S2 as shown in FIG. 4B. On the other hand, four frames E are subsequent in the video signal S3 read out from the frame memory 4, which means that the video signal S3 is not the 3-3 pattern as sown in FIG. 4C. The case causes deterioration in display quality.

The 2-3 cycle detecting circuit detects that the input video signal S1 of the NTSC format is a telecine-converted video signal in the above-mentioned embodiment. It may detect, however, that the line sequential scanning video signal S2 is a signal based on a telecine-converted video signal.

As described above, according to the present invention, two film frames of a film source can be properly frame-rate-converted from five frames (a 2-3 pattern) to six frames (a 3-3 pattern), so that the display quality of a telecine-converted image can be improved.

This application is based on a Japanese Application No. 2003-65043 which is hereby incorporated by reference.

What is claimed is:

1. A video signal processing apparatus comprising:
a detector which detects whether or not an input video signal is based on a telecine-converted video signal obtained by telecine conversion in a 2-3 pulldown conversion system from a film source having 24 film frames per second;
a frame memory;
a writing device which writes the input video signal in said frame memory on a line sequential scanning frame unit base in synchronism with a first vertical synchronizing signal for writing;
a reading device which reads out the written line sequential scanning video signal in said frame memory in synchronism with a second vertical synchronizing signal for reading; and
a synchronism controller which generates the second vertical synchronizing signal having a frequency different from a frequency of the first vertical synchronizing signal in synchronism with the first vertical synchronizing signal of a starting frame of five frames forming a pattern after the conversion in the 2-3 pulldown conversion system when said detector judges that the input video signal is based on a telecine-converted video signal.

2. The video signal processing apparatus according to claim 1, further comprising a line sequential scanning converter, when the input video signal is an interlaced scanning video signal, which converts the interlaced scanning video signal into a line sequential scanning video signal to supply the line sequential scanning video signal to said frame memory,
wherein said detector detects whether or not the input video signal is based on said telecine-converted video signal in accordance with the interlaced scanning video signal.

3. The video signal processing apparatus according to claim 1, further comprising a synchronism detector which detects a vertical synchronizing signal in the video signal supplied to said frame memory to generate the first vertical synchronizing signal.

4. The video signal processing apparatus according to claim 1, wherein the different frequency is 6/5 of the frequency of the first vertical synchronizing signal, and wherein said synchronism controller generates the second vertical synchronizing signal by six times in a period of five cycles of the first vertical synchronizing signal.

* * * * *